US012808549B2

(12) United States Patent
Böttinger et al.

(10) Patent No.: US 12,808,549 B2
(45) Date of Patent: Nov. 24, 2026

(54) COOKING APPLIANCE

(71) Applicant: Welbilt Deutschland GmbH, Eglfing (DE)

(72) Inventors: Eric Böttinger, Eberfing (DE); Dominik Korthals, Oberau (DE); Hannes Wild, Riegsee (DE)

(73) Assignee: Welbilt Deutschland GmbH, Eglfing (DE)

( * ) Notice: Subject to any disclaimer, the term of this patent is extended or adjusted under 35 U.S.C. 154(b) by 623 days.

(21) Appl. No.: 18/229,391

(22) Filed: Aug. 2, 2023

(65) Prior Publication Data

US 2024/0044513 A1 Feb. 8, 2024

(30) Foreign Application Priority Data

Aug. 3, 2022 (DE) ......................... 102022119502.3

(51) Int. Cl.
*F24C 15/32* (2006.01)
*F24C 15/02* (2006.01)
*H05B 6/68* (2006.01)

(52) U.S. Cl.
CPC .......... *F24C 15/325* (2013.01); *F24C 15/023* (2013.01); *H05B 6/68* (2013.01)

(58) Field of Classification Search
CPC ...... F24C 15/325; F24C 15/023; F24C 15/02; F24C 7/087; F24C 14/005; F24C 7/085; H05B 6/68
See application file for complete search history.

(56) References Cited

U.S. PATENT DOCUMENTS 3,329,529 A 7/1967 Lamar
4,491,065 A * 1/1985 Poulson ................ F24C 15/325 34/604

(Continued)

FOREIGN PATENT DOCUMENTS

CN 1980498 A 6/2007
DE 4222092 A1 1/1994

(Continued)

OTHER PUBLICATIONS

German Office Action, German Patent Application No. 102022119502.3, May 19, 2023, 2 pgs.

(Continued)

*Primary Examiner* — Robert G Bachner
(74) *Attorney, Agent, or Firm* — LOZA & LOZA, LLP; David S. Sarisky

(57) ABSTRACT

A cooking device, in particular a commercial cooking device, comprises a housing, a cooking chamber in the housing and a door for closing the cooking chamber, a heating device for heating the cooking chamber, a first load assembly, which is disposed for power supply in a first load circuit, a fan assembly with electric motor for generating air circulation in the cooking chamber, wherein the fan arrangement is disposed for power supply in a fan load circuit, and a power supply device, wherein the first load circuit is connected to a first load circuit terminal of the power supply device, and wherein the fan load circuit is connected to a fan load circuit terminal of the power supply device, wherein the power supply device comprises a first load circuit switch for switching the first load circuit and a fan load circuit switch for switching the fan load circuit.

10 Claims, 2 Drawing Sheets

(56) References Cited

U.S. PATENT DOCUMENTS

| | | | | |
|---|---|---|---|---|
| 5,880,436 | A | 3/1999 | Keogh | |
| 2010/0140260 | A1 | 6/2010 | Kim | |
| 2017/0045233 | A1* | 2/2017 | Stephens | F24C 14/005 |

FOREIGN PATENT DOCUMENTS

| | | | |
|---|---|---|---|
| DE | 19813537 | A1 | 9/1999 |
| DE | 10349814 | A1 | 6/2005 |
| DE | 102010002877 | A1 | 9/2011 |
| DE | 102013110975 | A1 | 9/2014 |
| EP | 3250002 | A1 | 11/2017 |
| GB | 2119922 | A | 11/1983 |
| KR | 100671828 | B1 | 1/2007 |
| WO | 2011039089 | A1 | 4/2011 |
| WO | 2011113653 | A1 | 9/2011 |

OTHER PUBLICATIONS

European Office Action, EP Patent Application No. 23189037.7, Jan. 29, 2026, 6 pgs.
European Search Report, European Patent Application No. 23189037.7, Dec. 8, 2023, 7 pgs.
European Office Action, European Patent Application No. 23189037.7, Jul. 16, 2025, 7 pgs.
European Office Action, EP Patent Application No. 23189037.7, Jul. 1, 2026, 7 pgs.

* cited by examiner

COOKING APPLIANCE

CROSS-REFERENCE TO RELATED APPLICATION

This application claims priority to German Patent Application No. DE102022119502.3, entitled "Cooking Device" and filed on Aug. 3, 2022, which is expressly incorporated by reference herein in its entirety.

BACKGROUND

The invention relates to a cooking appliance or device, in particular a commercial cooking device, for processing food.

SUMMARY

It is a problem of the present invention to provide a cooking device, in particular for commercial use, which ensures safe and user-friendly operation with a compact design.

The problem is solved by the features of the independent claim. The dependent claims refer to preferred developments of the invention.

Thus, the invention discloses a cooking device shown below. In particular, the cooking device is a commercial cooking device. Accordingly, the cooking device is in particular adapted for use in commercial kitchens. The cooking device can be, for example, a hot air circulator or a steamer. In particular, it is provided that the cooking device provides both hot air circulation and steam cooking functions. Furthermore, it is preferably provided that the cooking device shown herein is adapted for processing, in particular for cooking, food for human consumption.

The cooking device comprises a housing. A cooking chamber is disposed in the housing. The cooking chamber can be closed via a door. In particular, the door is attached to the housing via at least one door hinge and is thus pivotal. The pivot axis of the door is preferably vertical.

Furthermore, the cooking device comprises a heating device for heating the cooking chamber. The heating device is in particular adapted as an electric heating device. Preferably, the heating device comprises at least one heating element disposed at and/or in the cooking chamber. Preferably, the heating device is a resistance heating device, wherein the at least one heating element comprises a corresponding electrical resistance such that it can be used to heat the cooking chamber when supplied with current. Additionally, or alternatively, the heating device can be adapted to be heated with gas as fuel.

Furthermore, the cooking device comprises a first load assembly disposed in a first load circuit for being supplied with power. In the first load assembly at least one load, preferably multiple loads, is disposed. In particular, it is provided that the cooking device comprises a human machine interface, hereinafter referred to as HMI. Via the HMI, a user of the cooking device can obtain information about the cooking device and/or make operating inputs. The HMI comprises, for example, a display, in particular a touch display, and/or at least one indicator lamps and/or at least one switch that can be actuated by the user and/or a microphone for voice control and/or a camera for monitoring the cooking chamber and/or a camera for monitoring the insertion area in front of the cooking chamber. Preferably, the HMI is disposed in the first load assembly and is thus supplied with power via the first load circuit.

In addition, the first load assembly can comprise further loads—hereinafter generally referred to as load elements. It is preferably provided that the first load assembly comprises as load elements: at least one sensor, in particular a temperature sensor, and/or a lighting, in particular cooking chamber lighting, and/or at least one fan and/or at least one switchable valve, in particular a hand shower, and/or at least one pump.

The cooking device preferably comprises a fan arrangement. The fan arrangement comprises an electric motor for generating air circulation in the cooking chamber. For this purpose, it is provided in particular that the electric motor is connected with a corresponding fan wheel. The fan wheel is disposed in particular in or at the cooking chamber. Preferably, the fan wheel is connected coaxially with the electric motor, so that the output shaft of the electric motor drives the fan wheel directly without a gear.

Preferably, the electric motor is a DC motor. Particularly preferably, the electric motor is a brushless DC motor. Furthermore, the fan arrangement can comprise motor electronics (also referred to as motor control). The motor electronics are connected upstream with the electric motor and controls the electric motor corresponding to, for example, the desired speed or with a desired acceleration or deceleration ramp.

The fan arrangement is supplied with power in a fan load circuit. In particular, the electric motor is supplied with power via the motor electronics in the fan load circuit.

Furthermore, the cooking device comprises a power supply device with a first load circuit terminal and a fan load circuit terminal. It will be further explained below that the power supply device can optionally comprise at least a second load circuit terminal. It is understood that the power supply device can comprise further load circuits. Thus, in particular, the "at least one second load circuit" with the associated second load circuit switch is representative of further load circuits and further load circuit switches.

The first load circuit terminal and the at least one second load circuit terminal and the fan load circuit terminal can also be referred to as outputs of the power supply device.

The first load circuit terminal of the power supply device is connected to the first load circuit of the cooking device. The fan load circuit of the cooking device is connected to the fan load circuit terminal of the power supply device.

The power supply device preferably comprises a first load circuit switch for switching the first load circuit and a fan load circuit switch for switching the fan load circuit. Provided that the power supply device comprises the optional second load circuit terminal, it is preferably also provided that the power supply device comprises a second load circuit switch for switching the second load circuit.

Preferably, it is provided that both the first load circuit and the fan load circuit can be switched on and off via the associated switch in the power supply device (first load circuit switch or fan load circuit switch). Thus, no individual assembly is required to switch the load circuits. In particular, this results in a very compact structure and a simple design of the safety concept. In particular, the supply of the fan arrangement via the common power supply device results in the possibility for compact design and safe switch-off of the fan arrangement by switching off the fan load circuit via the fan load circuit switch.

The switches in the power supply device—first load circuit switch and/or second load circuit switch and/or fan load circuit switch—are in particular adapted and disposed in such a way that each load circuit can be switched selectively and thus independently of the other load circuit.

Accordingly, it is preferably provided that the first load circuit can be selectively switched via the first load circuit switch without necessarily switching the other load circuits. Additionally, or alternatively, it is preferably provided that the fan load circuit is selectively switchable via the fan load circuit switch without necessarily switching the other load circuits. Additionally, or alternatively, it is preferably provided that the second load circuit is selectively switchable via the second load circuit switch without necessarily switching the other load circuits.

The power supply device is preferably adapted for connecting to an AC grid. In particular, it refers to an AC grid in a housing. For this purpose, the power supply device preferably comprises an AC/DC converter. The AC/DC converter is preferably adapted for a three-phase wide input voltage range of 3~200-480 volts and/or a one-phase wide input voltage range of 1N~ or 2~100-240V.

The load circuits—in particular the first load circuit and/or the fan load circuit and/or the second load circuit—are preferably DC load circuits. Accordingly, it is preferably provided that the first load circuit terminal and/or the fan load circuit terminal and/or the second load circuit terminal are adapted as DC outputs of the power supply device.

It is further preferred that the AC/DC converter(s) is/are adapted to provide the multiple load circuit terminals with different voltages. For example, a voltage of 36 volts is provided for the fan load circuit, whereas 24 volts is preferably provided for the first load circuit and/or for the second load circuit.

Furthermore, it is preferably provided that the power supply device comprises an EMC filter.

Furthermore, it is preferably provided that the power supply device comprises a power monitoring module connected to at least one load of the first load assembly and/or the second load assembly via a power monitoring bus. In particular, the power monitoring bus is connected to the HMI, so that corresponding information, for example about the current consumption in the individual load circuits, can be displayed via the HMI.

The power supply device is in particular a single, self-contained unit. In particular, the power supply device comprises its own power supply device housing. The power supply device is preferably disposed within the housing of the cooking device. Thereby, the power supply device can protrude at least partially from the housing of the cooking device and/or be disposed at an opening of the housing, for example to ensure cooling.

Particularly preferably, the AC/DC converter and the switches (first load circuit switch and/or fan load circuit switch and/or second load circuit switch) are disposed within the one power supply device housing, in particular at a common printed circuit board.

Preferably, the cooking device comprises a door switch arrangement adapted to detect a position of the door. This is in particular advantageous as certain safety precautions can be taken in dependency on the door. For example, when the door is opened, the electric motor of the fan arrangement should be switched off to avoid any possible injuries caused by the rotating fan wheel. Further, to increase safety, it can be necessary to switch off the heating device, when the door is open.

Thus, it is preferably provided that the door switch arrangement is adapted to detect whether the door is open or closed.

Furthermore, the cooking device is preferably adapted to switch off the fan load circuit via the fan load circuit switch when the door is detected open. Furthermore, it is in particular provided that the cooking device is adapted to switch on the fan load circuit again via the fan load circuit switch when the closed door is detected.

In cooking devices, the door is often initially opened with a gap, so that steam can escape from the cooking chamber. It can be advantageous for the fan arrangement to remain active, to move the steam out through the gap as quickly as possible. However, if the door is opened further, the fan arrangement should be switched off.

Therefore, the door switch arrangement is preferably adapted not to switch off the fan load circuit, when the opening gap is up to a predetermined size, and to switch off the fan load circuit, when the opening gap is more than the predetermined size. In particular, the predetermined size is 20 mm to 70 mm.

The cooking device preferably comprises a second load assembly. The second load assembly, or the loads in the second load assembly, is/are disposed in the aforementioned second load circuit for being supplied with power. As described, the second load circuit is connected to the second load circuit terminal of the power supply device. For the optional second load circuit terminal, the power supply device comprises a second load circuit switch for switching the second load circuit, i.e., for selectively switching the load circuit on and off.

The door switch arrangement is preferably disposed between the second load circuit terminal and the second load assembly; in particular, the power supply to the second load assembly is provided via the door switch arrangement. The door switch arrangement is preferably adapted to switch off the second load assembly in dependency of the detected position of the door.

In the second load assembly, and thus in the second load circuit, in particular loads are disposed, which are to be switched, when the door is open. As already mentioned, the fan arrangement is deactivated by its own fan load circuit switch, when the door is opened. In addition, however, it is also preferably provided that other elements of the cooking device are deactivated, when the door is open. This includes, for example, the heating device and/or a circulation of a cleaning fluid in the cooking chamber.

Thus, it is preferably provided that at least one heating switch is disposed in the second load assembly. Particularly preferably, multiple of the heating switches are provided to be able to switch the heating device on and off in different levels. The heating switches are in particular electromagnetic relays or semiconductor relays or other power electronics.

The at least one heating switch is preferably adapted in such a way that it is off in the power-off state, i.e., when the second load circuit is switched off, and thus no longer supplies current to the associated heating element.

As mentioned, the circulation of the cleaning fluid can also be disposed in the second load assembly and thus in the second load circuit. The cleaning fluid is pumped or sprayed into the cooking chamber with a corresponding pump in particular. A circulation switch is preferably provided to deactivate the circulation. The circulation switch can, for example, switch off the associated pump or control a valve correspondingly, so that the cleaning fluid is no longer pumped into the cooking chamber. The circulation switch is preferably disposed in the second load circuit and is preferably adapted to prevent the circulation of the cleaning fluid in the power-off state.

In a simple design, where only the states "door open" and "door closed" need to be distinguished, it can be sufficient, when the door switch arrangement comprises one door switch.

In a preferred embodiment, it is provided that the door switch arrangement comprises a first door switch and a second door switch. The two door switches are disposed offset from each other along the door gap, i.e., either at the door or at the housing; in particular, one of the two door switches is disposed closer to the at least one door hinge. This means that, when the door is opened, the one door switch, which is disposed further away from the door hinge, reacts first and only later the second door switch reacts, whereby it can be distinguished, whether the door is only open with a small gap or is open further. Furthermore, this makes it possible to easily change the attachment side (hinge side) of the door, wherein one or the other door switch provides the relevant signal depending at the attachment side.

By taking the door position into account, in particular via the two door switches, the electric motor of the fan arrangement can remain activated and hot air can thereby be expelled from the resulting door gap. This is particularly advantageous, when changing from a hot recipe to sensitive food, e.g., low-temperature cooking of fish. There is no risk of the user touching the rotating fan wheel.

The door switch arrangement preferably comprises a door switch logic unit that connects the switching states of the two door switches corresponding to each other. For example, this can be a simple logical operator that only deactivates the power supply to the second load assembly and/or provides the signal to the fan load circuit switch, when both door switches are open.

Both when using the one door switch and when using the two door switches, the door switches can be adapted as contactless as well as contacting switches. For example, for the design of the contacting switch, a spring-loaded pin can be disposed at the housing side or door side and pushed in by the door or housing. The non-contacting door switch may, for example, be adapted as an optical switch or proximity switch.

Furthermore, it is also provided to detect the position of the door in another manner. For example, a rotation angle sensor can be disposed in or at of the door hinges, which detects the position of the door as part of the door switch arrangement.

As mentioned, the power supply device is adapted to be connected to an AC grid. Preferably, it is provided that the heating device is also adapted for being connected to the AC grid and in particular is not provided with power via the power supply device. In contrast, the fan arrangement is in particular not adapted for connecting to the AC grid, since the fan arrangement and in particular the electric motor are supplied with power via the fan load circuit and thus via the power supply device.

In particular, the cooking device comprises a connection cable, which protrudes from the housing and can be connected to an, in particular 1-phase or 3-phase, AC connection of a housing. Alternatively to the connection cable, a plug or a clamping device for connecting to a corresponding connection cable can also be provided in or at the housing of the cooking device. Inside the housing, the supplied AC is supplied to both the power supply device and the heating device.

The heating device preferably comprises a main contactor that is supplied with the AC at the input side and is connected to the at least one heating switch at the output side, in particular to the multiple heating switches. The at least one heating switch in turn switches the at least one heating element. In particular, a one-phase or three-phase supply of multiple heating elements is provided. Correspondingly, multiple heating switches are also provided to selectively switch the individual phases.

In particular, the main contactor is disposed within the housing of the cooking device, but outside the power supply device.

Preferably, a safety circuit is provided. The safety circuit preferably comprises one or more safety temperature limiters, which switch off the main contactor. Preferably, the safety circuit, in particular the safety temperature limiter(s), is supplied with power via the first load circuit.

Furthermore, it is preferably provided that the power supply device is connected to the safety circuit and is adapted to switch off the fan load circuit via the fan load circuit switch and/or the second load circuit via the second load circuit switch, when the main contactor is switched off. It is particularly preferred that the first load circuit is not switched off, when the main contactor is switched off. This means that at least basic functions, such as the HMI, remain active. For example, it can be indicated at the HMI that the main contactor has been switched off due to an excessively high temperature.

Furthermore, it is preferably provided that the cooking device comprises a device switch. The device switch is in particular disposed for actuation, in particular touch, by a user. Preferably, the device switch is disposed at the front side of the cooking device; that is, at the same side of the cooking device as the door of the cooking device.

The device switch is preferably directly or indirectly connected to the first load circuit switch for switching the first load circuit switch and/or directly or indirectly connected to the second load circuit switch for switching the second load circuit switch and/or directly or indirectly connected to the fan load circuit switch for switching the fan load circuit switch. The indirect connection in particular takes into account that the device switch is connected to a microcontroller in the power supply device. The signal from the device switch can be evaluated in the microcontroller of the power supply device. The microcontroller in turn is adapted to control the respective load circuit switch in dependency of the signal from the device switch. In particular, a separate digital output of the microcontroller serves as the input of the load circuit switch(es) (hardware gate).

In particular, the device switch is adapted to be set to different, in particular more than two, switching positions by the user. For example, the device switch can be switched into the different switching states by repeated switching and/or by longer switching and/or by a specific switching pattern. This makes it possible to selectively control the first load circuit switch and the fan load circuit switch and possibly also the second load circuit switch via the single device switch. This allows functions such as on/off, standby and reboot to be performed. For the power-off state of the cooking device, for example, all load circuits are switched off. For the standby mode, for example, the first load circuit can remain switched on, wherein the other two load circuits (second load circuit and fan load circuit) are switched off. For a reboot, for example, it can be sufficient to switch off the first load circuit shortly and then switch it on again.

BRIEF DESCRIPTION OF THE DRAWINGS

Further details, advantages and features of the present invention will be apparent from the following description of embodiments with reference to the drawing. It shows in.

DETAILED DESCRIPTION

In the following, an embodiment of a cooking device 1 is described in detail with reference to FIGS. 1 to 3. This is a commercial cooking device 1, adapted as a combi steamer, with which both steam cooking and hot air cooking are possible.

Before going into detail on the principles of the present invention, it should be emphasized that in the context of this application the term "cooking device" is understood to include both commercial cooking devices and household cooking devices and, in general, food processing devices, which can perform both cold and hot processing of food and can comprise, for example, hot air steamers, combi-steamers, automatic drink dispensers, drink mixers, microwave devices and other food processing devices.

Figure 1:
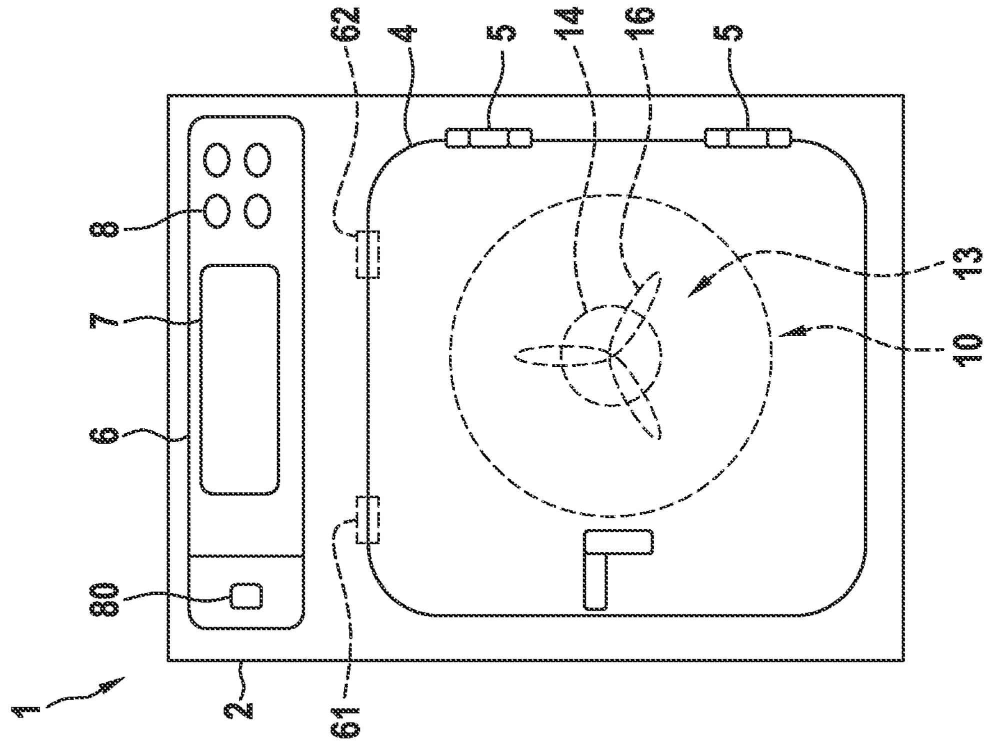
FIG. 1 a schematic front view of a cooking device of the invention according to an embodiment, FIG. 2 a schematic side view of the cooking device of the invention according to the embodiment, and FIG. 3 a schematic view of the power supply of the cooking device of the invention according to the embodiment.

FIG. 1 shows a schematic front view of the cooking device 1. FIG. 2 shows a schematic side view of the cooking device 1. Accordingly, the cooking device 1 comprises a housing 2. A cooking chamber 3 is formed in the housing 2. The cooking chamber 3 is closed via a door 4. The door 4 is attached via door hinges 5, so that the door can be opened and closed.

A human machine interface (HMI), hereinafter referred to as HMI 6, is disposed above the door 4. The HMI 6 comprises a display 7, in particular adapted as a touch display. Furthermore, the HMI 6 can comprise one or multiple indicator lamp(s) 8 to display operating states of the cooking device 1. Furthermore, it is possible that the HMI 6 comprises further buttons or switches that can be actuated by the user correspondingly to control the cooking device 1.

Furthermore, the HMI 6 can be adapted for voice control and accordingly can comprise a microphone. It is further provided that the HMI 6 comprises at least one camera, for example to detect, which food are inserted into the cooking device 1 and/or to monitor the cooking chamber 3, for example to detect a cooking condition of the food or to detect a need for cleaning in the cooking chamber 3.

Furthermore, the cooking device 1 comprises a heating device 9. The heating device 9 comprises multiple heating elements 10, which, when supplied with a corresponding current, heat the cooking chamber 3. The heating device 9 further comprises a main contactor 11 and multiple heating switches 12, which are disposed between the main contactor 11 and the heating elements 10. The heating switches 12 are shown in the schematic diagram in FIG. 3.

The cooking device 1 further comprises a fan arrangement 13. The fan arrangement 13 comprises an electric motor 14 for driving a fan wheel 16. Furthermore, the fan arrangement 13 can comprise motor electronics 15 (see FIG. 3).

Figure 2:
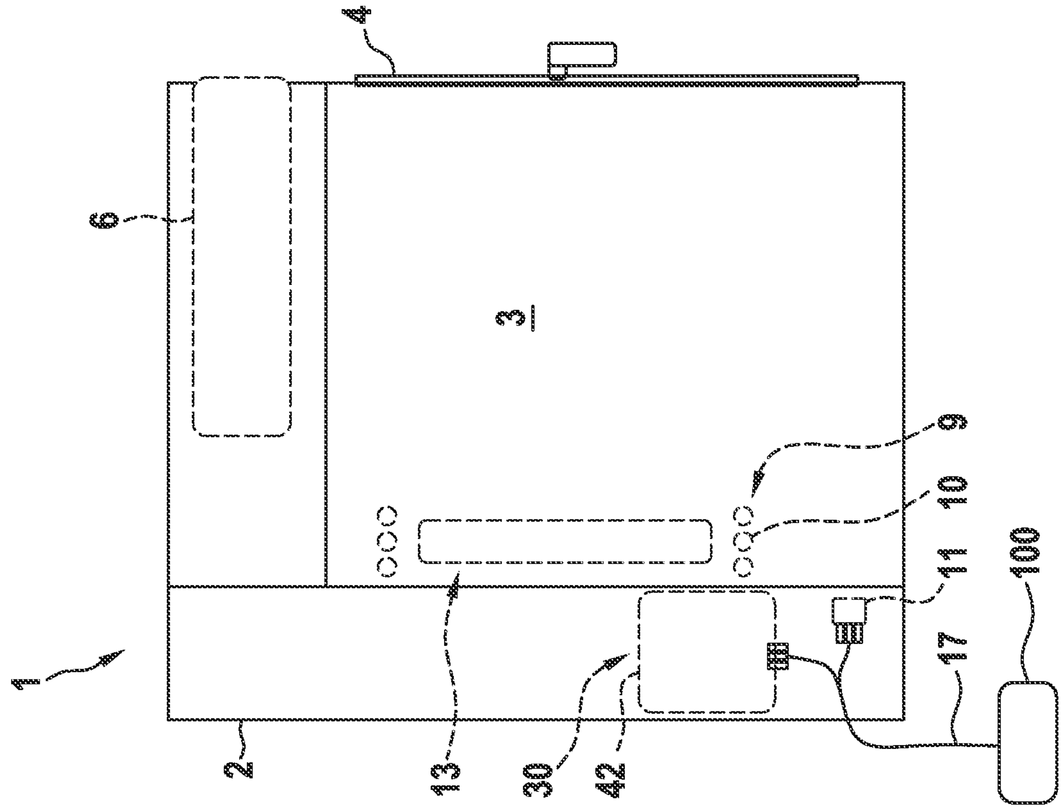

According to FIG. 2, a power supply device 30 is disposed in the housing 2 of the cooking device 1 as explained in the general part of the description. Both the power supply device 30 and the main contactor 11 of the heating device 9 can be connected to an AC terminal 100 via a connection cable 17.

Figure 3:
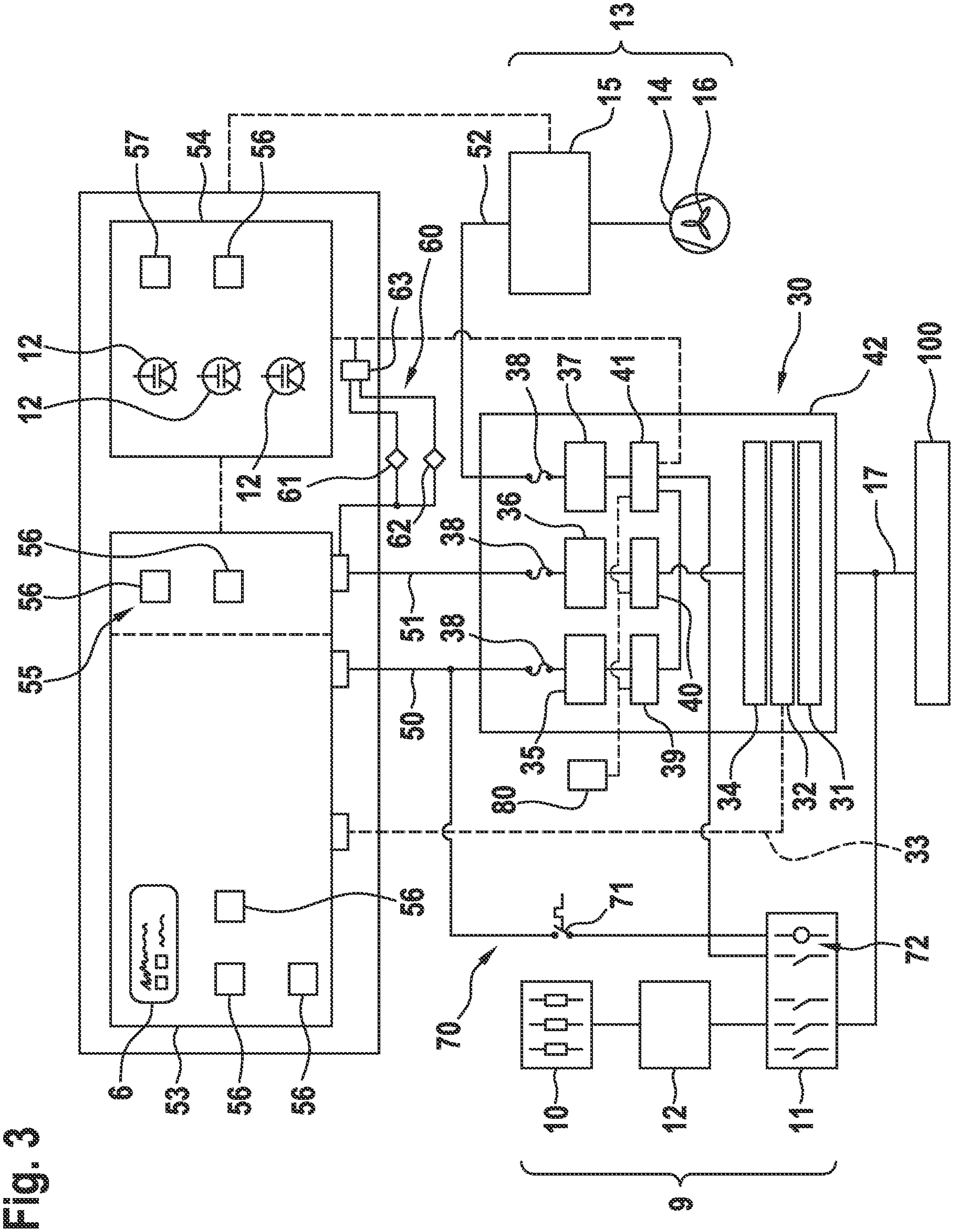

FIG. 3 shows a schematic view of the power supply of the cooking device 1. The power supply device 30 is shown with its power supply device housing 42. Within the power supply device housing 42, an AC/DC converter 34 is disposed, which is connected with the connection cable 17. Further, the power supply device 30 can comprise an EMC filter 31 and a power monitoring module 32. The power monitoring module 32 is connected to a power monitoring bus 33. The power monitoring bus 33 can provide data to another element of the cooking device 1, in particular to the HMI 6.

Furthermore, the schematic diagram in FIG. 3 shows that the power supply device comprises a first load circuit terminal 35, a second load circuit terminal 36 and a fan load circuit terminal 37. The terminals 35, 36, 37 can be adapted in or on the power supply device housing 42. Further, it is also possible that corresponding cables extend from the power supply device housing 42 and the cables form the terminals 35, 36, 37.

Preferably, each terminal 35, 36, 37 is protected via an own fuse 38 of the power supply device 30.

The power supply device 30, in particular in the power supply device housing 42, comprises a first load circuit switch 39, a second load circuit switch 40 and a fan load circuit switch 41. With the first load circuit switch 39, the first load circuit terminal 35 is switchable. With the second load circuit switch 40, the second load circuit terminal 36 is switchable. With the fan load circuit switch 41, the fan load circuit terminal 37 is switchable.

The switches 39, 40, 41 in the power supply device 30 are in particular semiconductor relay switches or electromagnetic relay switches. The switches 39, 40, 41 can also comprise corresponding switch logic, which enables the switches 39, 40, 41 to process one or more input signals and to switch in dependency on the one or more input signals.

FIG. 3 further illustrates that a first load circuit 50, a second load circuit 51 and a fan load circuit 52 are provided in the cooking device. The first load circuit 50 is connected to the first load circuit terminal 35. The second load circuit 51 is connected to the second load circuit terminal 36. The fan load circuit 52 is connected to the fan load circuit terminal 37.

In the upper portion of FIG. 3, a first load assembly 53 is shown. The HMI 6, and possibly other load elements 56, is disposed in the first load assembly 53 as explained in the general part of the description.

The first load assembly 53 is primarily supplied with power via the first load circuit 50. However, it can be necessary, for example due to legal requirements, to arrange only loads with a maximum permissible total power in a load circuit. Therefore, within the scope of the present invention, it is preferably provided to assign at least one load element 56 to a load sub-assembly 55. The load sub-assembly 55 is supplied with power via the second load circuit 51. In this way, it is possible to distribute the different loads, depending on their power, to the two load circuits 50, 51.

Furthermore, a second load assembly 54 is defined. In the second load assembly 54, in particular loads are disposed, which are to be switched off, when the door 4 is opened, as explained in detail in the general part of the description. Accordingly, the heating switches 12 are disposed in the second load assembly 54. Furthermore, a circulation switch 57 can also be disposed in the second load assembly 54, as explained in detail in the general part of the description.

Furthermore, the second load assembly 54 can also comprise other load elements 56.

FIG. 3 further illustrates the structure of a door switch arrangement 60. In the embodiment shown, the door switch arrangement 60 comprises a first door switch 61 and a second door switch 62. As the illustration in FIG. 1 shows, the second door switch 62 is disposed closer to the door hinges 5. Both door switches 61, 62 react to a pivoting of the door 4, as explained in the general part of the description.

The door switch arrangement 60 comprises a door switch logic unit 63, for example adapted as a simple logic operator. In the embodiment shown, the two door switches 61, 62 are configured to allow current flow in the activated state, i.e., when the door 4 is close enough to the respective door switch 61, 62 (in particular, when the door switch 61, 62 is pressed by the door). In particular relevant in the arrangement shown according to FIG. 1 is the door switch 62, which is disposed closer to the door hinge 5. Only when the door 4 is opened far enough, in particular further than a gap of 50 mm, the door switch arrangement 60 interrupts a power supply to the second load assembly 54 via the second load circuit 51.

The first door switch 61 is in particular relevant for being able to change the attachment side (hinge side) of the door 4. If the door attachment is changed from the right position shown (see FIG. 1) to the left position, so that the door hinges 5 are disposed at the left with respect to the illustration in FIG. 1, the first door switch 61 is relevant.

The dashed line between the second load assembly 54 and the first load assembly 53 illustrates that the information via the position of the door 4, in particular "door open" and "door closed", is also transmittable to loads, in particular the HMI 6, of the first load assembly 53.

Furthermore, a dashed line in FIG. 3 shows a connection of the door switch arrangement 60 with the fan load circuit switch 41. According to the schematic figure, it is possible to switch the fan load circuit switch 41 in dependency of the position of the door, as explained in the general part of the description.

As already explained, the heating device 9 comprises the main contactor 11, the multiple heating switches 12 and the multiple heating elements 10. FIG. 3 shows schematically at the lower left the heating switches 12 between the main contactor 11 and the heating elements 10. In the schematic representation, the heating switches 12 are also shown at the upper right at the second load assembly 54, since the heating switches 12 are associated with the second load assembly 54.

FIG. 3 further illustrates a safety circuit 70 with one or more safety temperature limiter(s) 71. The safety circuit 70 is connected to the first load circuit 50. Via the safety circuit 70, a main contactor switch 72 can be switched in the main contactor 11 to disconnect the heating device from the AC terminal 100. In particular, the second load circuit switch 40 and/or the fan load circuit switch 41 are also connected to the safety circuit 70, so that the two switches 40, 41 can also be switched off, when the main contactor switch 72 is switched off.

FIGS. 1 and 3 further show a device switch 80, which is disposed at the front side of the cooking device 1 according to the illustration in FIG. 1. The device switch 80 is connected to the first load circuit switch 39, the second load circuit switch 40 and the fan load circuit switch 41 and can selectively switch the switches 39, 40, 41 as explained in the general part of the description.

It will be understood that the power supply device 30 shown can comprise other load circuits. Thus, in particular, the second load circuit 51 with the associated second load circuit switch 40 is representative of further load circuits and further load circuit switches.

In addition to the foregoing written description of the invention, explicit reference is hereby made to the graphic representation of the invention in all of the figures for the purpose of supplementary disclosure thereof

What is claimed is:

1. A cooking device comprising:

a housing;

a cooking chamber in the housing and a door for closing the cooking chamber;

a heating device for heating the cooking chamber;

a first load assembly connected to a first load circuit for power supply;

a fan arrangement with an electric motor for generating circulating air in the cooking chamber, wherein the fan arrangement is connected to a fan load circuit for power supply;

a power supply device, wherein the first load circuit is connected to a first load circuit terminal of the power supply device and the fan load circuit is connected to a fan load circuit terminal of the power supply device; and wherein the power supply device comprises a first load circuit switch for switching the first load circuit and a fan load circuit switch for switching the fan load circuit, wherein the cooking device comprises a door switch arrangement that is adapted to detect a position of the door, wherein the door switch arrangement is connected to the fan load circuit switch to switch the fan load circuit in dependency of the position of the door, wherein the door switch arrangement comprises at least a first door switch and a second door switch, wherein both door switches are operable by opening and/or closing the door; and in particular wherein one of the door switches is arranged closer to a door hinge than the other door switch.

2. The cooking device according to claim 1, wherein:

the first load circuit terminal and the fan load circuit terminal are adapted for DC load circuits, and/or the power supply device is adapted at input side for connecting to an AC grid, and/or the electric motor of the fan arrangement is a DC motor.

3. The cooking device according to claim 1, comprising a second load assembly that is disposed in a second load circuit for power supply, wherein the second load circuit is connected to a second load circuit terminal of the power supply device, and wherein the power supply device comprises a second load circuit switch for switching the second load circuit.

4. The cooking device according to claim 3, wherein the door switch arrangement is disposed between the second load circuit terminal and the second load assembly, wherein the door switch arrangement is adapted to switch off the second load assembly in dependency of the detected position of the door.

5. The cooking device according to claim 3, comprising a circulation switch for switching a circulation of a cleaning fluid passing through the cooking chamber, wherein the circulation switch is in the second load assembly.

6. The cooking device according to claim 3, wherein the heating device is switchable via at least one heating switch, wherein the at least one heating switch is in the second load assembly; and in particular wherein the at least one heating switch switches off the heating device, if the heating switch is in a power-off state.

7. The cooking device according to claim 1, wherein the heating device is formed as an electrical heating device, in particular as an electrical resistance heating device that is connectable via a main contactor that in particular is disposed outside the power supply device.

8. The cooking device according to claim 3, further comprising a main contactor and a safety circuit, wherein the main contactor can be switched off via the safety circuit with safety temperature limiter; and in particular wherein the power supply device is connected to the safety circuit and is adapted to switch off the fan load circuit by means of the fan load circuit switch and/or the second load circuit by means of the second load circuit switch, when the main contactor is switched off.

9. The cooking device according to claim 8, wherein the safety circuit is powered via the first load circuit.

10. The cooking device according to claim 3, comprising a device switch that is disposed to be actuated by a user, wherein the device switch:

is connected to the first load circuit switch for switching the first load circuit switch, and/or is connected to the second load circuit switch for switching the second load circuit switch, and/or is connected to the fan load circuit switch for switching the fan load circuit switch.

* * * * *